United States Patent [19]
Brauer

[11] Patent Number: 5,157,329
[45] Date of Patent: Oct. 20, 1992

[54] APPARATUS FOR SENSING ROTATION HAVING AN ENCODER BIASED TOWARDS A STATIONARY SENSOR AND A MEMBER TRANSMITTING ROTATION TO THE ENCODER

[75] Inventor: Michael C. Brauer, Burlington, Conn.

[73] Assignee: The Torrington Company, Torrington, Conn.

[21] Appl. No.: 607,181

[22] Filed: Oct. 31, 1990

[51] Int. Cl.$^5$ ............................................. G01B 7/14
[52] U.S. Cl. ........................... 324/207.25; 324/207.2; 324/207.21; 324/207.22
[58] Field of Search ................. 324/173, 174, 207.11, 324/207.12, 207.13, 207.2, 207.21, 207.22, 207.25

[56] References Cited
U.S. PATENT DOCUMENTS 3,716,121  2/1973  Frigger .............................. 324/174
3,745,392  7/1973  Phoenix et al. ..................... 324/173

Primary Examiner—Walter E. Snow
Attorney, Agent, or Firm—John C. Bigler

[57] ABSTRACT

An apparatus for sensing rotation of a rotary member comprising a fixed sensor, the sensor being stationary relative to the rotary member. An encoder rotates with the rotary member and is disposed adjacent the sensor. A biasing member for biasing the encoder is in close proximity into the sensor. The sensor may be a Hall effect sensor or a magnetic resistive sensor. The biasing member may be a well known biasing device such as a spring washer, a magnetic device, a hydraulic or pneumatic device.

16 Claims, 4 Drawing Sheets

APPARATUS FOR SENSING ROTATION HAVING AN ENCODER BIASED TOWARDS A STATIONARY SENSOR AND A MEMBER TRANSMITTING ROTATION TO THE ENCODER

BACKGROUND OF THE INVENTION

This invention relates generally to sensors and more particularly to a sensor wherein the encoder is biased into close proximity to the sensing element.

Electronic control units (ECU) amass information from sensors and command the action of many vital functions of automobiles. The major areas in which ECUs have made substantial inroads are the engine, the transmission, the suspension and the anti lock brakes.

In all of these cases, the data describing the rotational motion or positional change are fed to the ECU, which prepares a calculated or mapped response ideal for the operational conditions. The ECU then initiates changes in the controlled function to minimize deviation from the ideal condition. High reliability, good resolution and economic costs are desired in sensor technology.

The need to sense the position of automobile steering columns or shafts has developed because of active suspension systems, electronic power steering assistance, safe driver warning systems, four wheel steering as well as anti-lock brake and traction control systems. As such, various sensors have been created to detect speed, direction and a reference pulse (i.e. true position). The conventional means for obtaining steering wheel angle information is an optical sensor system or accelerometer.

Some of the major improvements in passenger comfort have been achieved as a result of improving the ride characteristics of automobiles. The improvements have been accomplished by, among other things, the introduction of active and semi active suspension systems. Conventional systems sense lateral acceleration which is input into the ride control ECU. There are several ways of obtaining lateral acceleration data. One popular way is to use steering column rotational positional information in conjunction with the vehicle speed for determining the resulting lateral acceleration.

The above systems use encoders attached to a rotary shaft which are located in close proximity to the sensor. In situations where the shaft undergoes considerable vibrations or motion the encoder may be deflected away from the sensor, leading to unreliable sensor indications.

The foregoing illustrates limitations known to exist in present sensors. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus for sensing rotation of a rotary member comprising a fixed sensor, the sensor being stationary relative to the rotary member. An encoder rotates with the rotary member, and is disposed adjacent the sensor. A biasing member biases the encoder in close proximity to the sensor.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
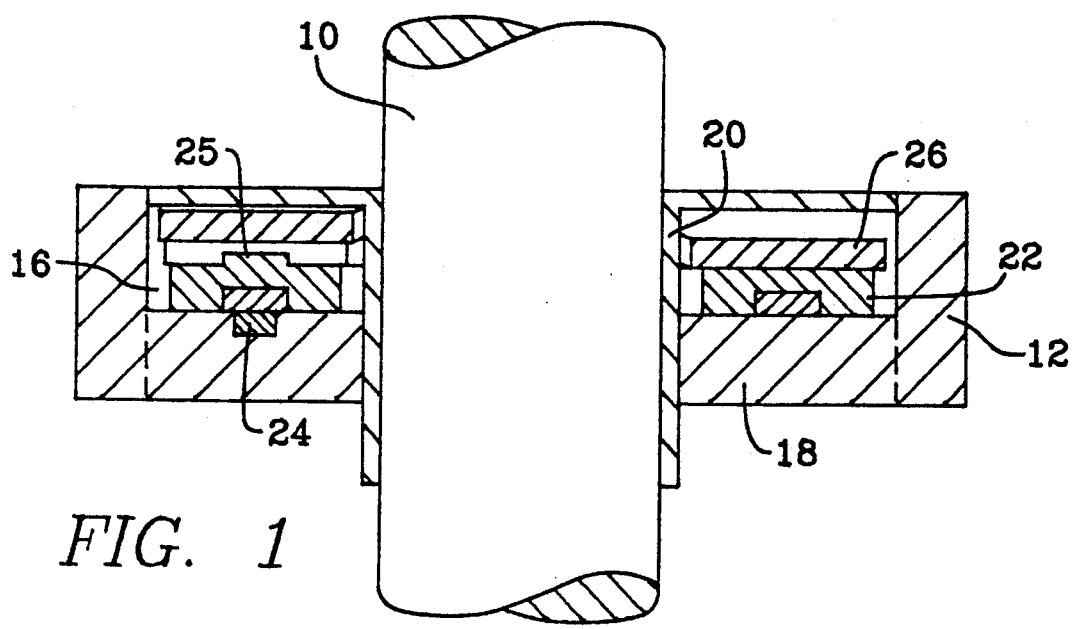
FIG. 1 is a cross sectional side view illustrating an embodiment of biased axial encoder of the instant invention.

In this disclosure, identical elements will be referred to using identical reference characters.

A rotary member or shaft 10 rotates relative to housing 12. The housing may be mobile such as a vehicle or immobile such as a heavy piece of machinery, but the instant invention is generally concerned with accurately determining relative motion between the rotary member and the housing.

The housing 12 surrounds the rotary shaft 10. The housing 12 has an encoder support 16 formed therein through. One axial side of the encoder support is defined by contact portion 18 formed in the housing 12. Alternately, various portions of the housing 12 may be removed or modified to fit the desired application.

A transmitting or connecting member 20 is rotationally connected to an annular encoder 22 and rotary shaft 10. The annular encoder 22 is located within the encoder support 16. The housing 12 may move in an axial direction relative to the rotary shaft 10. A sensing element or sensor 24 can sense rotational motion of the annular encoder and is mounted within the housing 12.

A biasing means 26 biases the annular encoder 22 into close proximity with the sensing element 24. To precisely transmit rotation of the biasing means 26 to the encoder 22, connecting means 25 are mounted on the biasing means 26 and the encoder respectively. The connecting means 25 may be any conventional method of attachment such as snap fit, adhesive or separate fastener.

Figure 5:
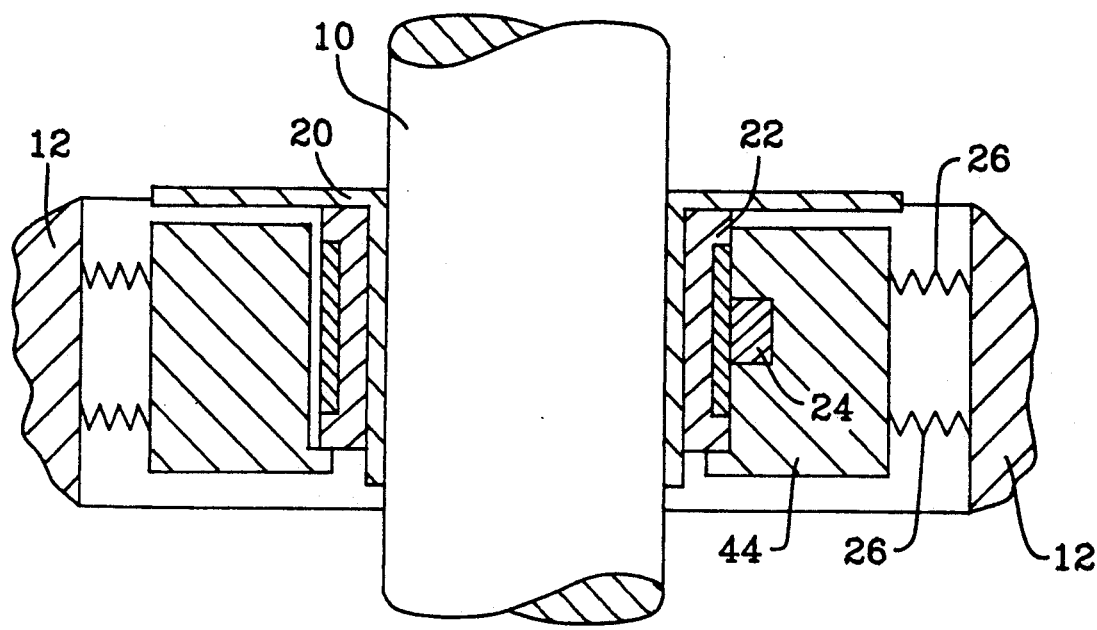
FIG. 5 illustrates a similar view of sensor as FIG. 1, except the encoder is radial in configuration and the housing is biased.
Figure 6:
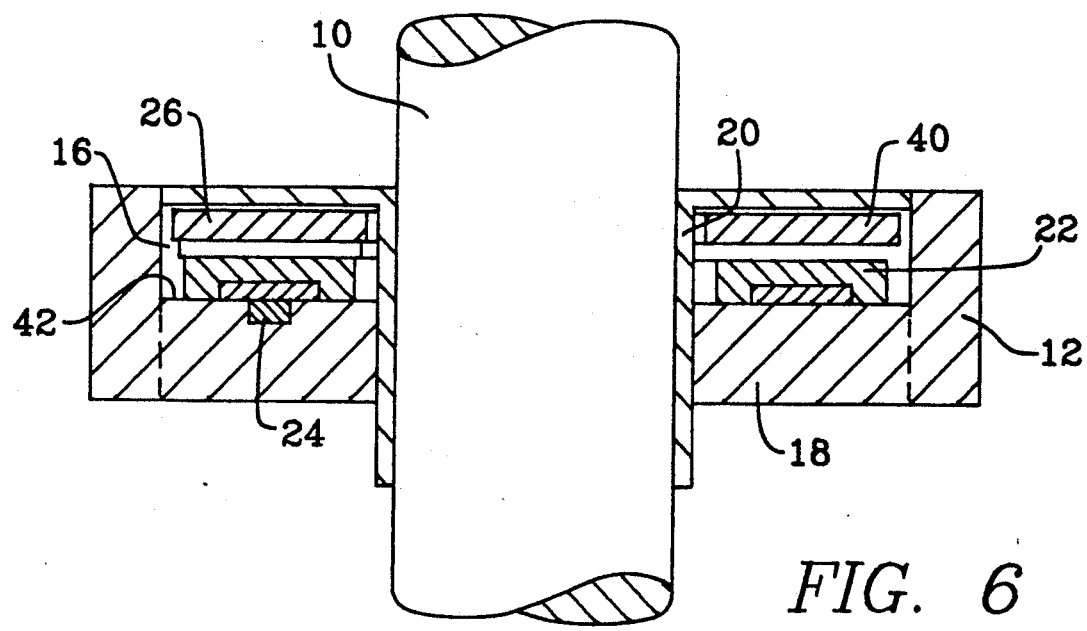
FIG. 6 illustrates a similar view of an alternate embodiment of biased encoder as FIG. 1, wherein the encoder is biased by a magnetic member.

The annular encoder 22 may be sensed by the sensor 24 in a radial direction relative to shaft 10 as illustrated in FIG. 5, or it may have an axial sensed configuration as illustrated in FIGS. 1 and 6. It is essential that the sensing element 24 be mounted in the same sensing orientation as annular encoder 22.

It is critical that the annular encoder 22 be in close proximity to the sensor 24 for the sensor to give reliable indications. If the housing 12 or shaft 10 is undergoing vibrations or severe forces, the prior art encoders may be deflected away from the sensing element to produce unreliable indications.

Figure 3:
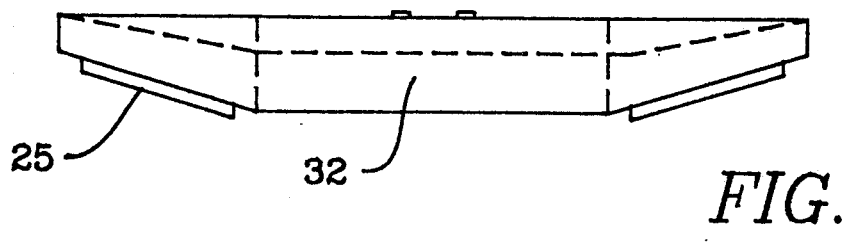
FIG. 3 is a side elevational view illustrating an alternate embodiment of biasing means which may be used to bias the encoder of the instant invention.
Figure 2:
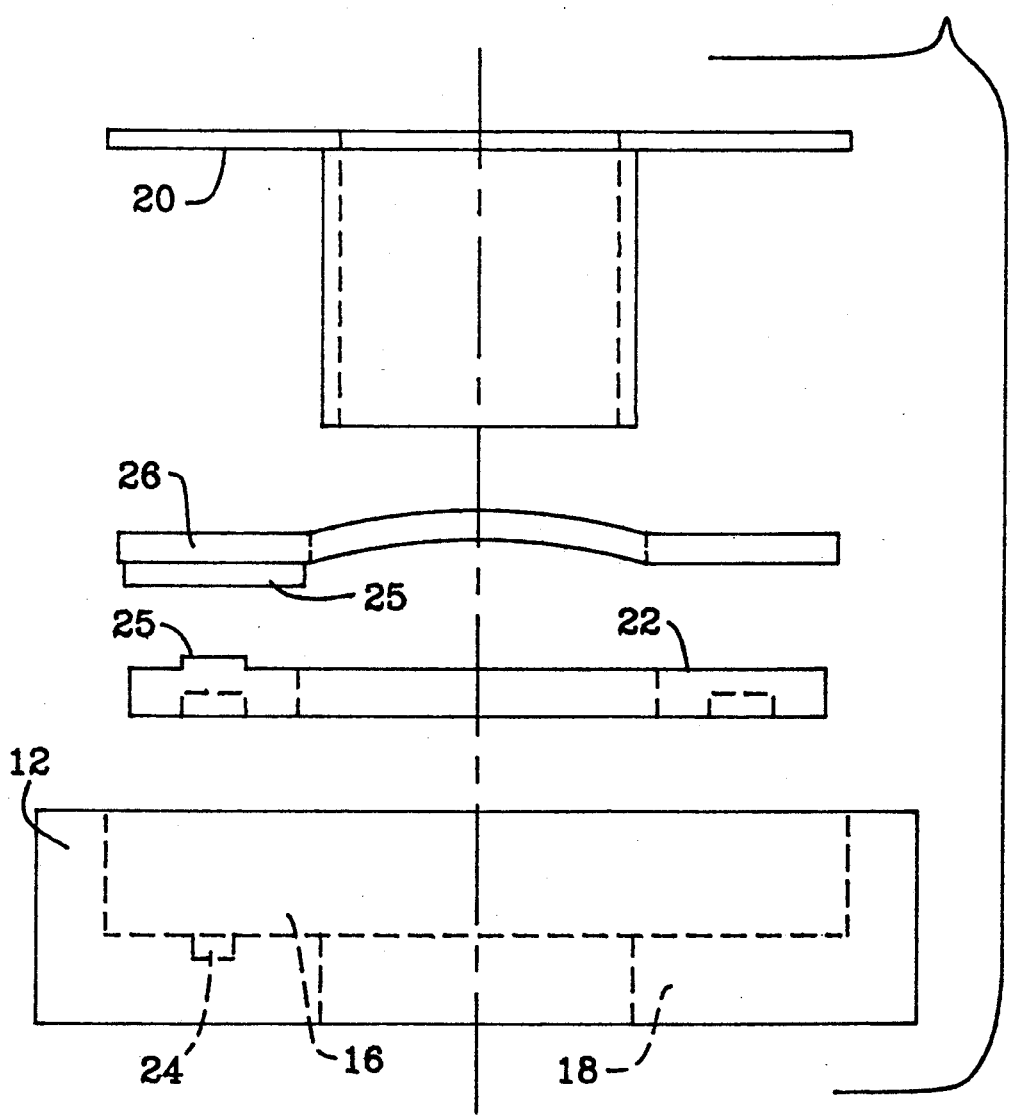
FIG. 2 is an exploded side elevational view illustrating the biased encoder of FIG. 1.

To minimize these unreliable indications, biasing means 26 acts to bias the annular encoder 22 into close proximity to the sensor 24. FIG. 1 and 2 illustrate a wave washer being used to bias the encoder 22. FIG. 3 illustrates a side elevational view of a belleville washer 32 which may alternately be used to bias the encoder. However, it is to be understood that any well known type of biasing means other than springs may be used to bias the encoder. Also, any type of spring washer other than belleville and wave washers may be used.

Figure 4:
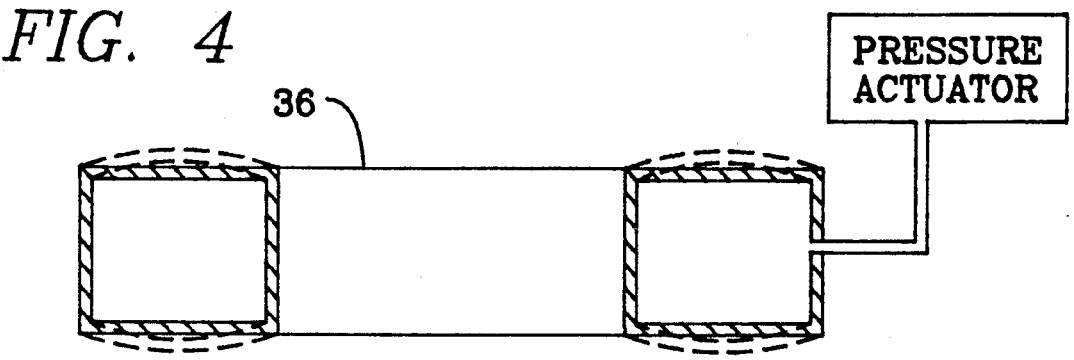
FIG. 4 illustrates a side cross sectional view of yet another alternate embodiment of biasing means which may be used to bias the encoder of the instant invention.

For example, a hydraulic or pneumatic device 36 (see FIG. 4) may be used to bias the encoder. A passive magnetic member 40 may also be used as illustrated in FIG. 6. In the passive magnetic device, the encoder 22 is magnetically repulsed or attracted by member 40 into contact with surface 42 where the sensor 24 is mounted. Encoder 22 may also provide the attactive or repulsive force as well as housing 12. For example, if housing 12 is made of steel, the encoder 22 may be magnetically attracted to it.

Various encoder 22 and sensor 24 types may be used in the instant device. Hall effect sensors are especially applicable, but magneto-resistive sensors may be used. Any encoder type whose effectiveness or reliability is enhanced by being placed in close proximity to the sensor is applicable for the instant invention.

Figure 7:
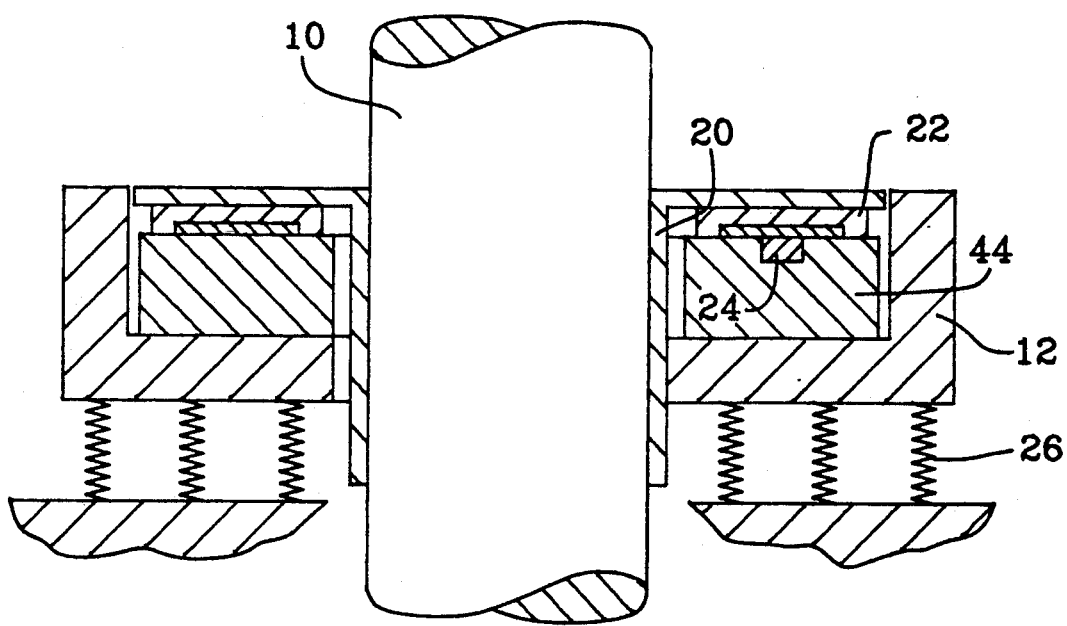
FIG. 7 illustrates a similar view as FIG. 1 of yet another alternate embodiment, having a biased sensor.

As illustated in FIGS. 5 and 7, the sensing element 24 may be biased into contact with the encoder 22, instead of vice versa. In these embodiments, a sensor support 44 is mounted to housing 12 and biased by biasing means 26 whereby sensing element 24 is in extremely close proximity to encoder 22.

In the FIG. 5 embodiment, a radial encoder 22 is illustrated. Use of a radial encoder 22 may be desired under certain space constraints.

Having described the invention, what is claimed is:

1. An apparatus for sensing rotation of a rotary member, comprising:
    a fixed sensor disposed adjacent the rotary member, said sensor being stationary relative to the rotary member;
    an encoder rotatable with the rotary member, the encoder being disposed adjacent the sensor;
    biasing means for biasing the encoder into close proximity to the sensor; and
    transmitting means for transmitting rotation of the rotary member to the biasing means.

2. The apparatus as described in claim 1, further comprising:
    a housing with an encoder support formed therein, the encoder being in contact with the encoder support.

3. The apparatus as described in claim 2, wherein the sensor is disposed within the housing in close proximity to the encoder support.

4. The apparatus as described in claim 1, wherein the biasing means is a spring.

5. The apparatus as described in claim 4, wherein the spring is annular in configuration, being disposed circumferentially to the rotary member.

6. The apparatus as described in claim 5, wherein the spring is a belleville washer.

7. The apparatus as described in claim 5, wherein the spring is a wave washer.

8. The apparatus as described in claim 1, wherein the encoder is an annular encoder which is sensed parallel to the axis of the rotary member.

9. The apparatus as described in claim 1, wherein the transmitting means further comprises:
    an intermediate member connecting the rotary member and the biasing means.

10. The apparatus as described in claim 1, further comprising:
    connecting means for transmitting rotational motion of the biasing means to the encoder.

11. The apparatus as described in claim 1, wherein the sensor is a magneto-resistive sensor.

12. The apparatus as described in claim 1, wherein the sensor is a Hall effect sensor.

13. The apparatus as described in claim 1, wherein the biasing means is a hydraulic device.

14. The apparatus as described in claim 1, wherein the biasing means is a pneumatic device.

15. The apparatus as described in claim 1, wherein the biasing means is an electro-mechanical device.

16. The apparatus as described in claim 1, wherein the biasing means is a passive magnetic device.

* * * * *